(12) United States Patent
Bandyopadhyay

(10) Patent No.: US 9,297,898 B1
(45) Date of Patent: Mar. 29, 2016

(54) ACOUSTO-OPTICAL METHOD OF ENCODING AND VISUALIZATION OF UNDERWATER SPACE

(71) Applicant: Promode R. Bandyopadhyay, Middletown, RI (US)

(72) Inventor: Promode R. Bandyopadhyay, Middletown, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 158 days.

(21) Appl. No.: 14/164,360

(22) Filed: Jan. 27, 2014

(51) Int. Cl.
  *G01S 15/00* (2006.01)
  *G01S 15/89* (2006.01)
(52) U.S. Cl.
  CPC ........................ *G01S 15/89* (2013.01)
(58) Field of Classification Search
  CPC ........................................ G01S 15/89
  See application file for complete search history.

(56) References Cited

U.S. PATENT DOCUMENTS 5,388,182 A * 2/1995 Benedetto ........... G10L 21/0208
  704/200.1

* cited by examiner

*Primary Examiner* — Luke Ratcliffe
*Assistant Examiner* — Hovhannes Baghdasaryan
(74) *Attorney, Agent, or Firm* — James M. Kasischke; Michael P. Stanley

(57) ABSTRACT

A method of depiction of an object in underwater space is provided. The underwater space is acoustically covered using nonlinear wave packets capable of retaining coherence in shallow waters. The echo from the object is encoded as perturbations on flexible cilia-like transducers that are otherwise undergoing limit cycle oscillations. The perturbed pattern of the cilia-like transducers is recorded as holograms and transmitted. The hologram is decoded and a hologram of the underwater space is created. A small hemispherical drive apparatus actuates the cilia to undergo the limit cycle oscillations. Electromagnets are positioned on a housing of the apparatus. A gimbal with shaft is also attached to the housing. The shaft has a first end within the housing that is proximally separated and remains separated from the electromagnets as the shaft rotates. Generated signals excite electromagnets in sequence to produce an electromagnetic track for the shaft.

10 Claims, 16 Drawing Sheets

ACOUSTO-OPTICAL METHOD OF ENCODING AND VISUALIZATION OF UNDERWATER SPACE

STATEMENT OF GOVERNMENT INTEREST

The invention described herein may be manufactured and used by or for the Government of the United States of America for governmental purposes without the payment of any royalties thereon or therefor.

This application claims the benefit of U.S. Provisional Patent Application No. 61/849,912; filed on Jan. 28, 2013 by the inventor, Dr. Promode Bandyopadhyay and entitled "ACOUSTO-OPTICAL METHOD OF ENCODING AND VISUALIZATION OF UNDERWATER SPACE".

BACKGROUND OF THE INVENTION (1) Field of the Invention

The present invention relates to an autonomic based method of nonlinear phase encoding and hologram-based transmission of coded echoes from an unstructured underwater environment with real time decoding and visualization of the environment.

(2) Description of the Prior Art

Visualizing underwater space, particularly in three-dimensions and in real time is of utmost importance. This visualization is accomplished mostly by passive or active sonar devices. Advanced arrays have been developed with serious shortcomings. Therefore, alternative concepts, theories and hardware are needed that would lead to a fundamentally different approach to visualizing underwater space.

In the natural world, large swimming animals such as dolphins inhabit shallow waters, and whales inhabit the deeper ocean. These separate species communicate with each other in each species and accurately detect objects. There is evidence that dolphins create an image of the environment using sonar in which the image is similar to the visible part of the electromagnetic spectrum. There does not seem to be much difference in the manner of detection between nearly blinded dolphins when in turbid rivers and the dolphins in oceans where there is more visibility.

Co-directivity is describable to justify a nonlinear approach to acoustic encoding of the environment. It is assumed that animals have to remain in synchrony with the environment to survive. It is also assumed that for persistent synchrony with the environment; the sensors, motion control neurons and the actuators need to have the same dynamics—namely nonlinear oscillatory autonomic. In other words, self-correcting dynamics of the Na and Ca ions in the membranes are closely related to the sensing and the flopping of motion actuators.

Neurons evolved to allow movement of life forms from point to point. The brain became more complicated to fulfill the needs of movements that had to be more complicated. Complexities in environments require a great deal of sensing which creates a difficult problem in the design of autonomous platforms. The question of should there be any rational foundation of integrating sensors, controllers and actuators in a platform is considered.

Observations made in the hearing and swimming propulsion of animals suggest that animals have a common dynamics probably determined by an intervening controller. Simulations are subsequently carried out which show that benefits in homing may accrue from such common dynamics which exhibits a preferred 'handedness'. It is hypothesized that sensors, controllers and actuators have common autonomic oscillatory nonlinear dynamics. This allows animals to be in persistent oscillatory synchrony with the environment.

The dynamics of the olivo-cerebellar neuron is measured using an analog circuit. Features of observed trajectories of bats and of cilium of paramecium are calculated using the olivo-cerebellar dynamics and it is suggested that chaos helps a platform to adapt to changes in environment.

To understand how animals achieve such feats; is there any common foundation in their sensing, control and propulsion? Animals can have a large number of sensors in their body for mapping the environment and sensing changes. In manmade platforms, an increase in sensing is demanding on processing and coordination with the controller and the motion actuators. Therefore, it is reasonable to expect that a common foundation in sensing, control and the mechanism of propulsion could be the key to autonomy. In this work, there is evidence for the existence of such a common foundation, and carry out simulations of motion to determine advantages that such a foundation might offer. Finally, the notional design of a non-linear volumetric and metachromic sensor is possible in which the design could offer autonomy in an unstructured environment that seem to be lacking in man-made platforms of today.

It is important to understand that muscles of animals are vibrating at roughly 10 Hz, however imperceptible the amplitude at a given instant may be. This vibration is not monochromatic and is nonlinear. Note that the motion of animals is controlled by inferior-olive neurons which are mathematically described as coupled nonlinear oscillators that are slightly unstable. They have a property called 'Self-Referential Phase Reset' whereby an external impulse can bring any number of de-correlated actuators (muscles) into a common phase.

It has been proposed that persistent synchrony with the environment, in all animals; the motion control inferior-olive neurons, the actuators (muscles) and the sensors operate on the same nonlinear dynamical system principles. Using this assumption and some principles of handedness; it was shown that a platform/animal would be able to home on to a moving target faster.

In order to enhance detection; a need therefore exists for an accessible version of the visualization process presently used in the natural world.

SUMMARY OF THE INVENTION

Accordingly, it is a general purpose and primary object of the present invention to provide a method for visualizing underwater space.

It is a further object of the present invention to provide a method for nonlinear phase encoding and hologram-based transmission of coded echoes from an underwater environment.

It is a still further object of the present invention to provide a hemispherical drive apparatus that provides cilium actuation receptive to nonlinear phase encoding.

To attain the objects described, the term "cilium" is used to define a transducer that is non-linear with an oscillating flexible line in which the flexible line is anchored at one end. The dynamics of a cilium is provided by a second order non-linear ordinary differential equation. Normally, the cilium vibrates in a track that is described as a "limit cycle". In other words, the cilium has self-correcting dynamics. This self-correcting control is termed "autonomic".

It has been found that the motion of a cilium can be calculated by summing the orthogonal oscillations of the cilium. In the present invention, the torques are applied by a hemispherical drive apparatus to the cilium with the apparatus providing a limit cycle oscillation (LCO). When a perturbation is applied to a cilium; the cilium will be disturbed from the limit cycle track.

During operation, reference coding and an echo coding of a target is created; a hologram is transmitted; and the hologram is decoded at a remote point. The reference coding includes acoustic illumination that disturbs the limit cycle oscillation of the cilium. This disturbed limit cycle oscillation is recorded as a reference hologram. Acoustic illumination upon the target is echoed to a dense cluster of the cilia on which the echo is encoded. A temporal wave amplitude, direction and frequency content get encoded into the cilium position and posture. The track and speed with which the cilium returns to the limit cycle oscillation (the autonomic properties of the cilium); provides information on an input disturbance to the cilia. Metachronism is used to read input to the cilium. A wave motion of a group of cilia is called a metachronic wave. The metachronic wave is a footprint of a large scale external impulse created by the motion of individual vibrating elements.

Also, each cilium is time dependent. Being time dependent provides the ability to encode a large amount of amplitude and phase information. Restated, the cilium motion is a limit cycle oscillation. If an input disturbance dislodges the cilium motion of the limit cycle from point A to B; the autonomic properties will return the cilium to the limit cycle oscillation after the disturbance has passed. The disturbance properties such as strength, direction, and frequency plus the arrival time determines the location of A and B. The path and speed that the cilium takes from B to return to the limit cycle oscillation are provided by autonomic equations. The equations also provide the required input disturbance properties.

The individual cilia are also sensitive to the direction and amplitude of the wave. If the wave is nonlinear and has a phase identity; then the collection of cilia will produce a visual image of the imposed disturbance. If there is a reference motion due to a transmitted wave, and the later imposed wave is an echo; then by differencing with the transmitted wave, an image of the surroundings from which the echo originates can be created.

In a multi-cilia configuration, when a neighboring cilia beats with a constant phase difference; the overall wave pattern is termed metachronic. For encoding the acoustically-painted object; a metachronic wave pattern would have to be created using the multi-cilia configuration. The echo distorts the autonomous reference metachronic wave pattern. This distortion is optically measured via the clustered pattern of the changes in the curvature and the torsion of individual cilia.

The system of the present invention also includes a hemispherical drive apparatus for cilium actuation in which the apparatus includes a plurality of electromagnets with each electromagnet having corresponding latitude and longitude coordinates.

The drive apparatus further comprises a gimbal positioned in a housing of the apparatus, and a shaft attached to the gimbal. The gimbal allows the shaft to roll and oscillate in different planes, wherein each plane is orthogonal to the other planes. The shaft remains spaced apart from the electromagnetic array by a predetermined distance as the shaft roll and oscillates. A fin is attached to an end portion of the shaft spaced apart from the housing.

The drive apparatus further comprises a control system with a controller for storing the coordinates of each electromagnet. The control system also includes signal generation circuitry for outputting signals that excite electromagnets in a predetermined order. The excitation of the electromagnets produces an electromagnetic track having flux lines that flow through the shaft; thereby, causing the fin to flap.

The control system also includes a computer for programming the controller with at least one sequence of latitude and longitude coordinates of electromagnets that are to be sequentially excited order in order to form the electromagnetic track. One pair of adjacent electromagnets is excited at a time and each succeeding pair of excited electromagnets is adjacent to a pair of previously excited electromagnets.

The control system drives a fin or cilium. For use of the flapping fin; the advantages of the hemispherical drive apparatus over conventional shaft and gear drives are: common oscillating shafts have nonuniform wear, hence there is leakage; the shafts each require too many gears; the shaft drives have vibration, backlash and are noisy; and the shaft drives are cumbersome in the actuation of roll and pitch.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

In the description, the term "cilium" is used to define an individual transducer. A cilium is non-linear with a three-dimensional oscillating flexible line in which the flexible line is anchored at one end. The dynamics of a cilium is provided by a second order non-linear ordinary differential equation. Normally, the cilium vibrates in a track that is described as a "limit cycle". In other words, the cilium has self-correcting dynamics.

If the vibration is damped; the cilium is naturally amplified to return the motion to the limit cycle. Alternatively, if the vibration is amplified, the cilium is naturally suppressed; whereby, the vibration returns to the limit cycle. This self-correcting sensor-less control is termed "autonomic".

Figure 1:
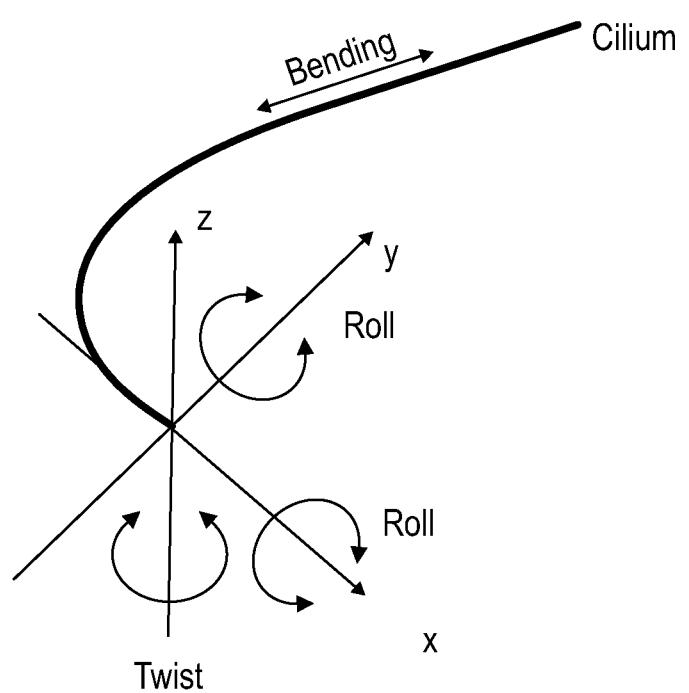
FIG. 1 is a schematic depicting orthogonal oscillations of a cilium.

Referring now to FIG. 1; it has been found that the motion of a cilium can be created by summing the orthogonal oscillations of the cilium. As per aero-elasticity theory (in certain frequency ranges and depending on the viscosity of the surrounding fluid); the motions can couple and there can be an exchange of energy between the motions. For an animal (such as paramecium), these torques are applied by the animal.

Figure 10:
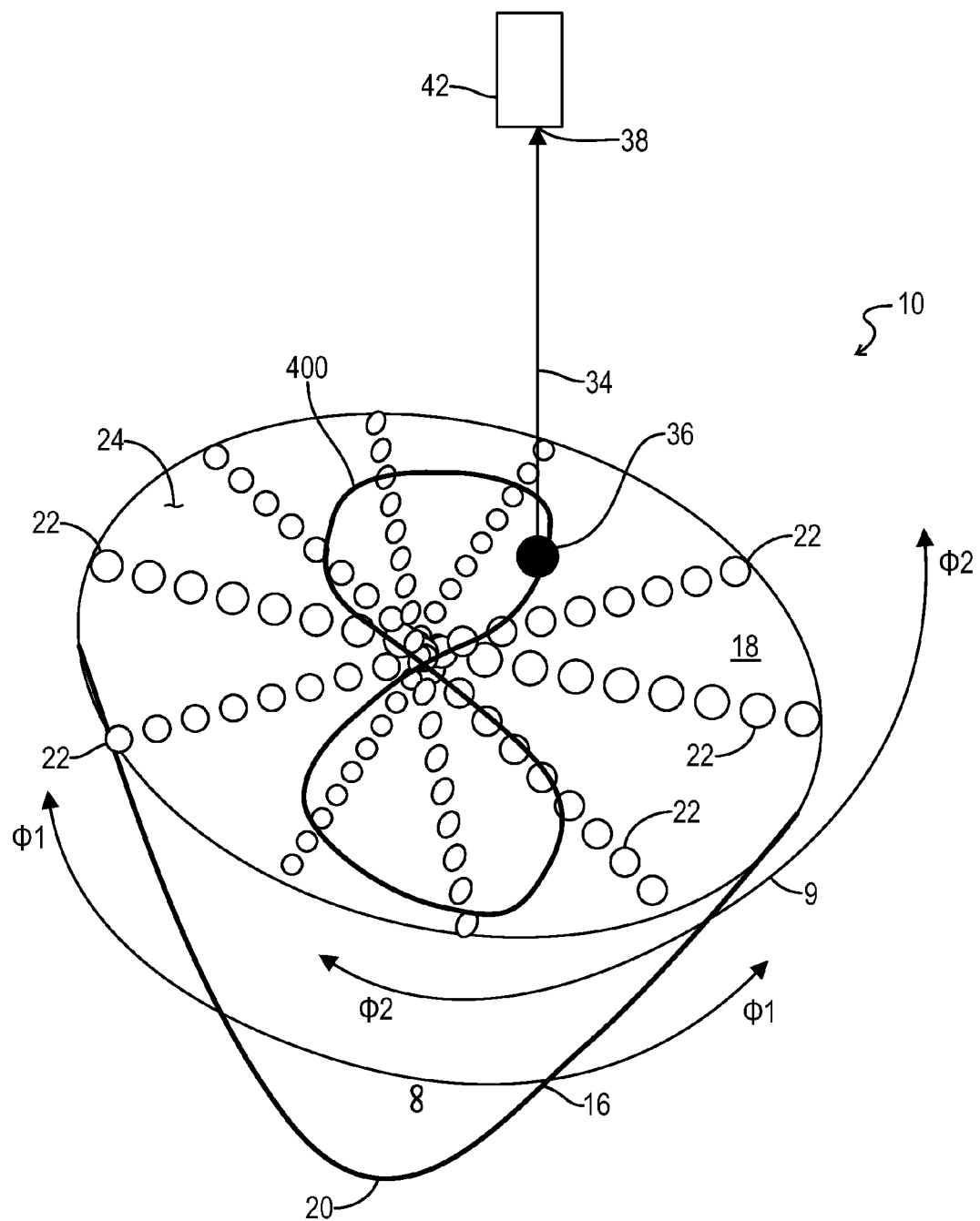
FIG. 10 is a isometric view of a hemispherical drive of the present invention in which the drive provides orthogonal roll motions to a cilium.

In the present invention, such torques are applied as a limit cycle oscillation (LCO) by a hemispherical drive apparatus 10 (see FIG. 10). When a perturbation is applied to a cilium; the cilium will be disturbed from the limit cycle track. The perturbation tensor is encoded in a map of a disturbed state space. The amplitude and phase of each cilium can be tensorially represented. The tensor is encoded into the temporal position, velocity and acceleration of the cilium multitude.

Generally, a target (object) is coded; a hologram is transmitted; and the hologram is decoded at a remote point. The target exists in unstructured temporal space and is coded with an imprint of the three-dimensional space representing numerous elements. The three-dimensional space can be separated into numerous mirrors slanted at different orientations from which an incident sound returns to the cilium. The echo from each mirror will include information on range, orientation and softness/hardness (material) composition. The imprint is transmitted; decoded; and a virtual object is created.

Figure 2A:
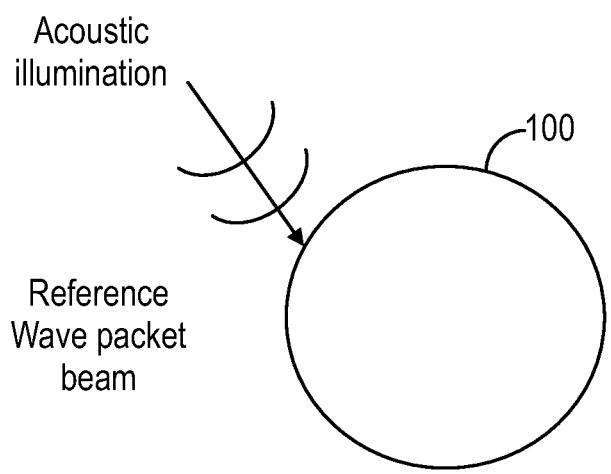
FIG. 2A is a representation of an acoustic illumination of a target.
Figure 2B:
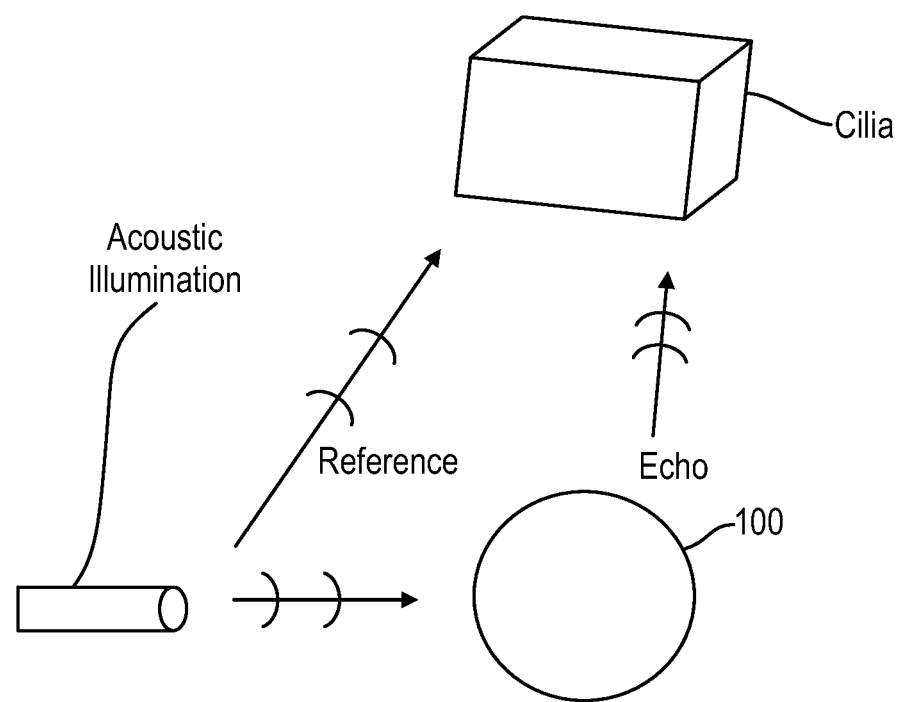
FIG. 2B is a representation of echo coding of a target.

FIG. 2A and FIG. 2B depict the steps of creating a reference coding and an echo coding of the target 100. The reference coding includes acoustic illumination that disturbs the limit cycle oscillation of the cilium. This disturbed limit cycle oscillation is recorded as a reference hologram. Acoustic illumination upon the target 100 is also echoed to a dense cluster of the cilia on which the echo is encoded. It should be noted that two holograms can be created to capture the reference and the echo. These holograms can then be transmitted over distances for processing.

Figure 3:
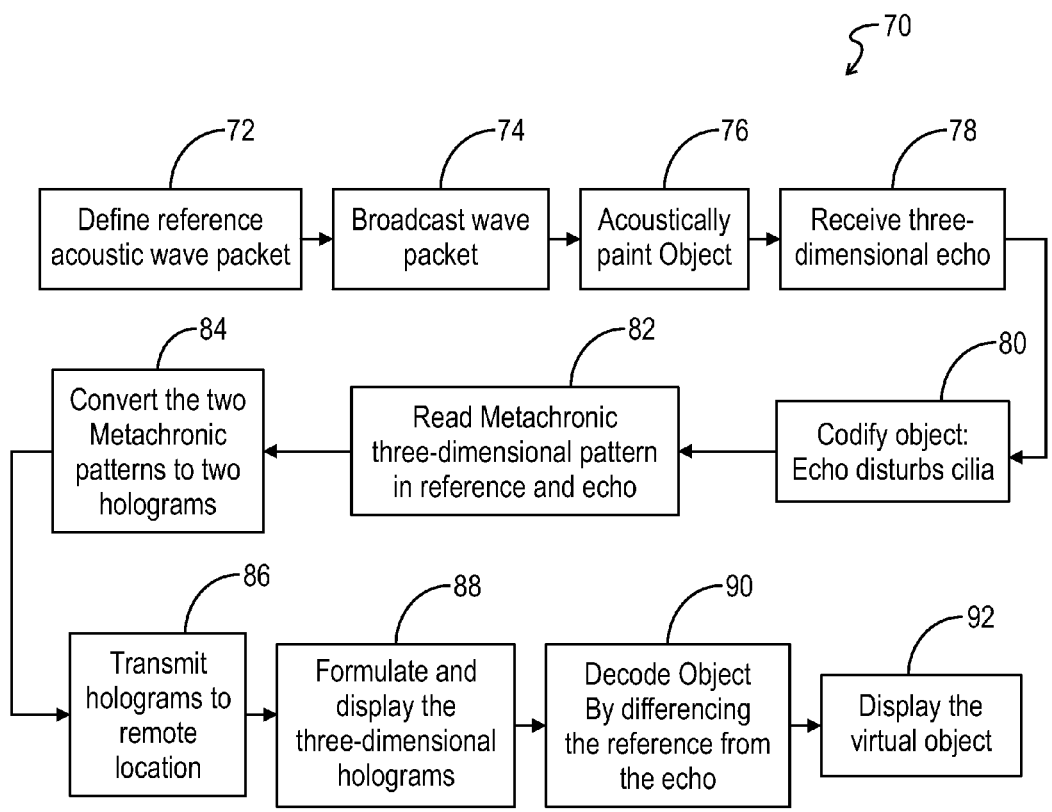
FIG. 3 is a flow chart representing the collection of a reference acoustic wave packet.

FIG. 3 depicts a flow chart 70 of steps for collection of a reference acoustic wave packet and surroundings on a three-dimensional array by acoustic painting and encoding of an environment in a cluster of cilium transducers. In step 72, a reference acoustic wave packet is defined using existing collections of gathered wave packets and broadcast in step 74. The target (object) 100 is acoustically painted in step 76 and an echo is received in step 78. The echo is codified in step 80 with the echo disturbing the cilia. The location of track dislocation (A-B in FIG. 7) and the track taken by the cilium to return to the limit cycle oscillation contain information on the incident disturbance (including the sound wave). The parameters are the positions of A, B, and C (the point of return) shown in FIG. 7. The track position, velocity and acceleration of paths in the figure would be converted to pressure wave information using calibration and known nonlinear equations for the cilium motion.

Returning to FIG. 3 and in step 82, a metachronic three-dimensional pattern is reflected in the reference and echo hologram and in step 84, the two metachronic patterns are converted into two holograms (a video of each cilium motion and their grouping is converted into a hologram). In step 86, the holograms are transmitted to a remote location and in step 88; the holograms are formulated and displayed. In step 90, the object (target 100) is decoded by differentiating the reference hologram from the echo hologram (differentiation is achievable by existing technology). Lastly in step 92; the virtual object (representing the target 100) is displayed.

Unlike a monochromatic frequency sweep of conventional sonar; in the present invention, the object/target is painted by a defined nonlinear acoustic wave packet. Due to the delayed arrival of the echo; the reference wave packet acts to start the limit cycle on the cilium 12. The echo arrives and disturbs the trajectories of the cilium 12. Minimal energy input (emission of one wave packet) is needed in the environment in active mode and continuous emission is not required.

Due to the nonlinear wave packet nature of the 'paint'; the coherence in the littoral (reverberating) areas is not lost. In explanation by natural world use, dolphins use chirps (wave packets) to ping objects in shallow water littoral regions and the wave packets do not lose their coherence. In signal processing using Fourier decomposition; relationships between frequencies are not easy to compute and are not frequently considered. In the natural world, chirps (wave packets) retain an identity over a distance because the wave packet consists of a specific group of frequencies that are related thru the same mechanism (equations) with specific amplitudes, dominant frequency content and phase relationship. The underlying mechanism is common to self-regulation.

Figure 4:
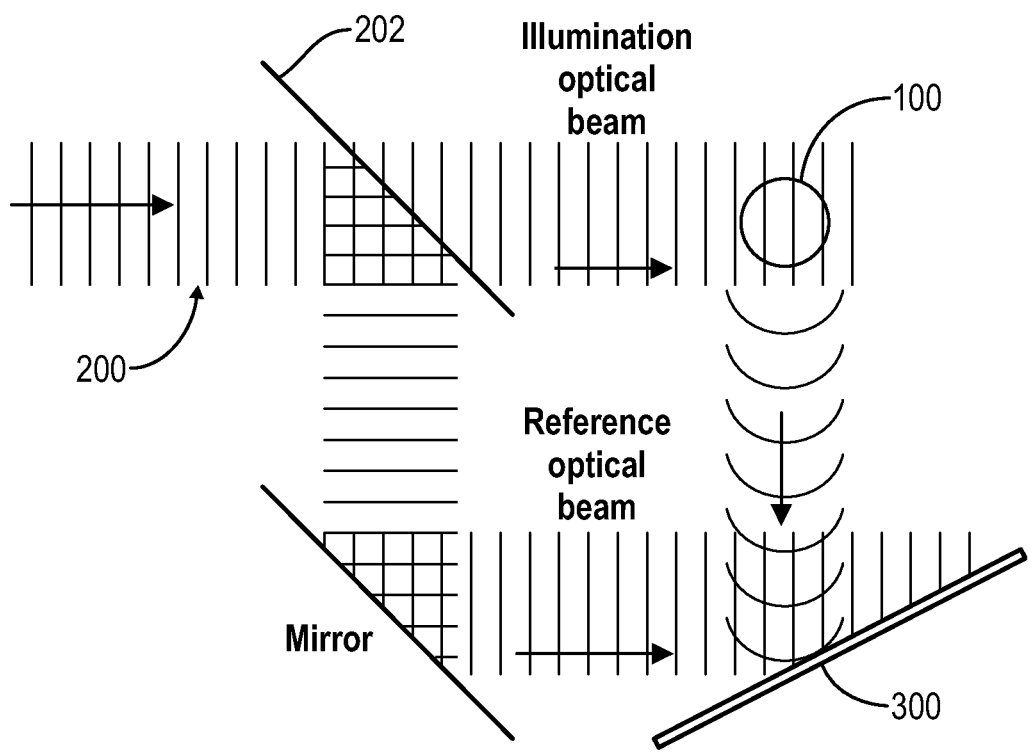
FIG. 4 is a schematic depicting creation of a hologram of a three-dimensional environment.

FIG. 4 depicts how a hologram of the imprint of a three-dimensional environment is created. In the figure, a pulsed laser (coherent light beam) 200 is split with a beam splitter 202 with a portion of the beam forming an acoustic illumination for the reference beam and a portion of the beam forming an acoustic illumination of the target 100.

Figure 5:
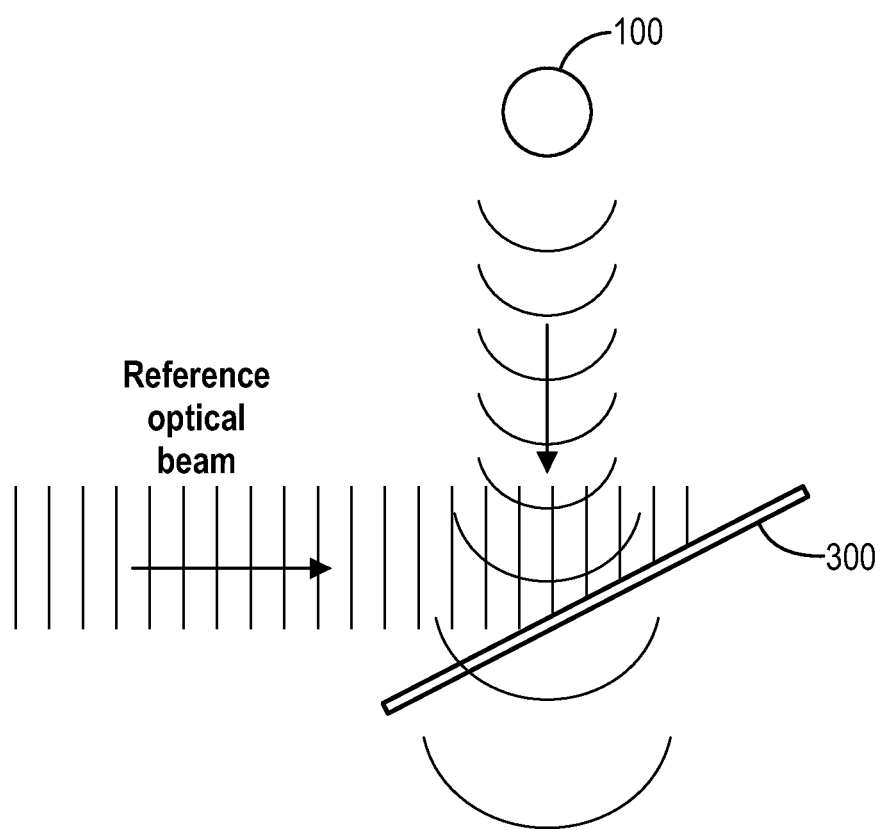
FIG. 5 is a schematic of a hologram reconstruction of a virtual object.

FIG. 5 shows a hologram reconstruction of a virtual object being transmitted to a recording plate 300 at a remote facility. Two holograms are reconstructed at the remote facility—one hologram of the effects of the reference wave packet and one hologram due to the echo off the target 100.

The reference acoustic wave packet can be dolphin-inspired. A library of dolphin pings can be used as the diagnostic wave packet in the present invention. Such wave packets have a range of frequencies and maintain coherence in the reverberating environment of the shallow waters of a littoral ocean.

Typically, wave packets appear in a burst. However, on inspection, there are time gaps between sub-bursts during which the echo is received. The bursts are tuned and altered based on the echo. These pings are calibrated for the boundary conditions of the tasks. The dolphin ping library can be used for both the reference and the echo generation.

Described below is a theory of operation of the present invention. The operation is not meant to limit the present invention but instead provides a theory as to the usefulness of the invention.

Figure 6:
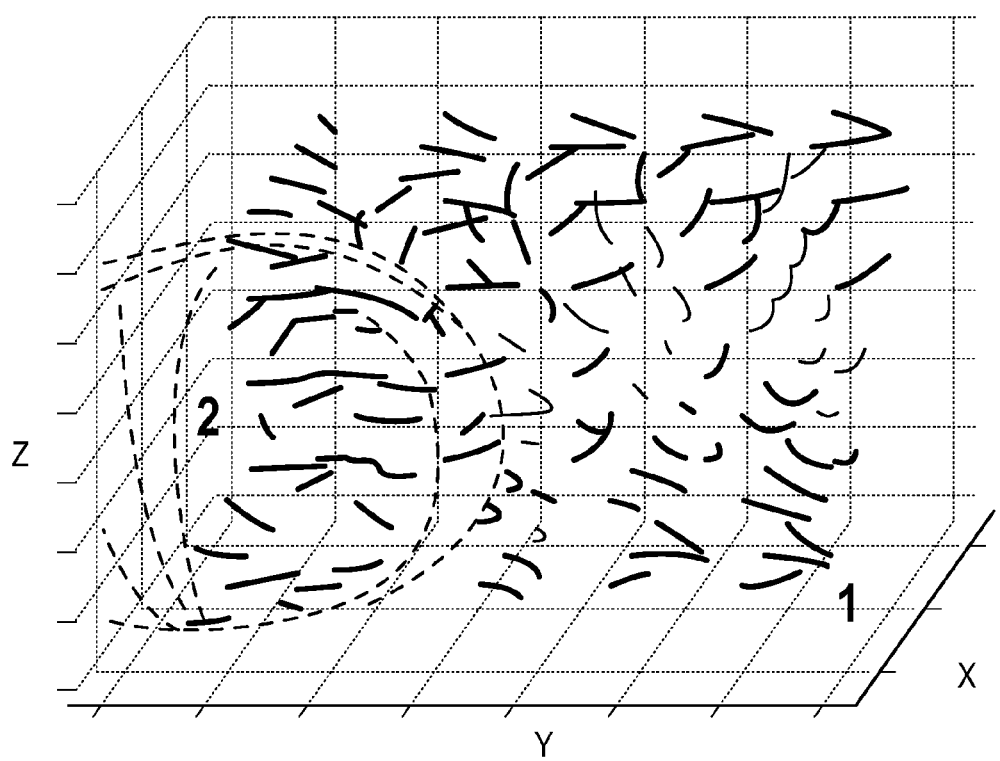
FIG. 6 is a screen depiction of an animation for an array of cilium transducer elements on which successive point blasts from acoustically painted sources are imprinted.

FIG. 6 depicts a simulation of how a 5×5×5 cluster of cilia would respond to two spherically expanding sounds originating at the lower right corner near the reader; followed by another blast from the middle of the vertical left face (marked as 1 and 2, respectively). The front of the second blast is shown as a sphere with the edge being recognizable. Time is represented by dark shading in which the darkness increases as the shading increases. The time is denoted by light shading when the cilia are set to the reference vibration. Subsequently, after the target 100 is subjected to a sound wave; if the target faces another wave from any direction then the light shading resumes. Each cilium 10 traverses a nonlinear limit cycle described by a van der Pol oscillator given by Equation (1). The lightest shaded lines at each cilium base are reference orientations.

Figure 7:
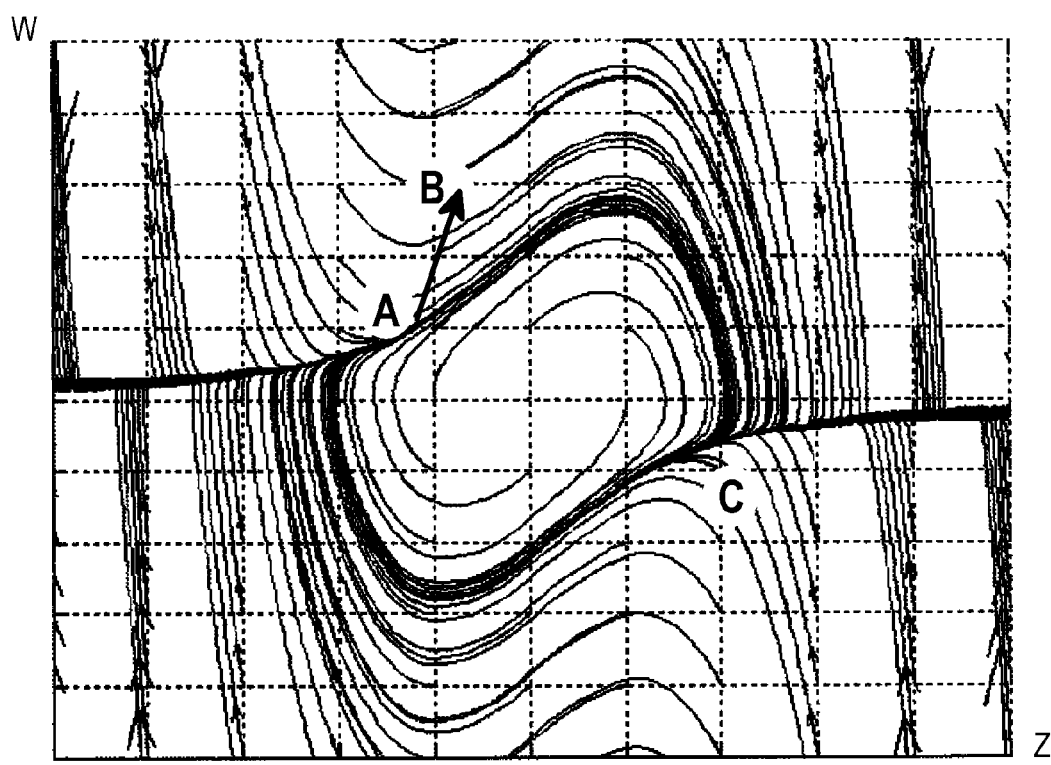
FIG. 7 is a van der Pol simulation of a typical limit cycle in which the simulation depicts cases of damped (inside the limit cycle) and amplified (outside the limit cycle) conditions.

FIG. 7 depicts a limit cycle for parameter values in Equation (1). Suppose the state is at "A" when the echo arrives to dislodge the cilium 10 to "B". The system will then return to the limit cycle near "C". Therefore, the relative location of "B" with respect to "A" and the return path to "C" capture the nonlinear information contained in the echo.

The map in FIG. 7 is two-dimensional; however, three-dimensional maps can be created using the states (z, v, w)—see Equation (1). The speed and path that the system takes to return to the limit cycle ("B" to "C") after being disturbed by the echo ("A" to "B") can be described by vectors (u(x,t)). Although pressure is scalar; the dynamics of the sound waves has been encoded using tensor. The conversion of echo pressure data to cilium position data is an encoding. It should be noted that a linearly vibrating rod does not have the ability to capture the amount of phase information as would a nonlinearly vibrating element.

Equation (1) shows the description of the inferior-olive neuron dynamics that controls the motion of animals. This description shows two coupled nonlinear oscillators; the nonlinear terms are given by "p". The oscillator is given by second order ordinary differential equations.

$$\begin{bmatrix} \dot{u}_i \\ \dot{v}_i \\ \dot{z}_i \\ \dot{w}_i \end{bmatrix} = \begin{bmatrix} k\varepsilon_{Na}^{-1}(p_{iu}(u_i) - v_i) \\ k(u_i - z_i + I_{Ca} - I_{Na}) \\ p_{iz}(z_i) - w_i \\ \varepsilon_{Ca}(z_i - I_{Ca}) \end{bmatrix} + \begin{bmatrix} 0 \\ 0 \\ 0 \\ -\varepsilon_{Ca} \end{bmatrix} \quad (1)$$

$$I_{exit}(t) \quad \begin{matrix} p_{iu}(u_i) = u_i(u_i - a)(1 - u_i) \\ p_{iz}(z_i) = z_i(z_i - a_i)(1 - z_i). \end{matrix}$$

The upper oscillator, which has a spikey and rich dynamic, is not needed. Instead, the transducer motion is modeled as a nonlinear oscillator where, for the ith oscillator, the states $z_i$ and $w_i$ are given by the differential Equation (2).

$$\dot{z}_i = p_{iz}(z_i) - w_i$$

$$\dot{w}_i = \varepsilon(z_i - I) \quad (2)$$

where the nonlinear function is given by $p_{iz}(z_i) = z_i(z_i - a_i)(1-z_i)$, $\varepsilon$ is a constant parameter controlling the time scale, $a_i$ is a constant parameter associated with the nonlinear function and I is a constant parameter. Equation (2) can be written as $$\ddot{z}_i + F(z_i)\dot{z}_i + kz_i + \varepsilon I = 0 \quad (3)$$

where F is a cubic polynomial function and k is a constant. Equation (3) resembles Lienard's oscillator (in contrast, the function F is a well-defined quadratic in the familiar van der Pol's oscillator). The oscillator exhibits a closed orbit in the state space that is $(z_i - w_i)$, which is also known as limit cycle oscillation with the constant parameters determining the form of the closed orbit.

Figure 8A:
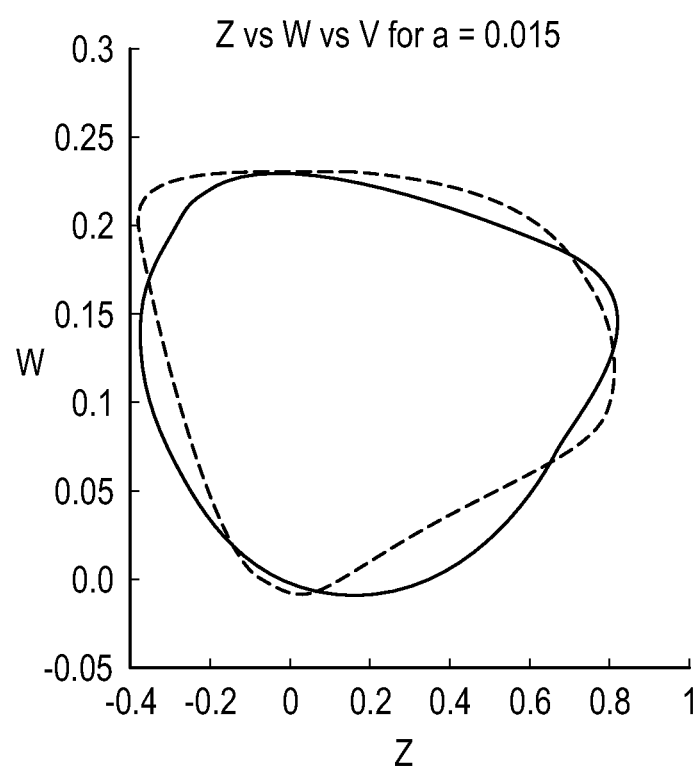
FIG. 8A is a position plot comparison of limit cycle oscillation (LCO) tracks of the cilium of a paramecium with computational tracks of the oscillator.
Figure 8B:
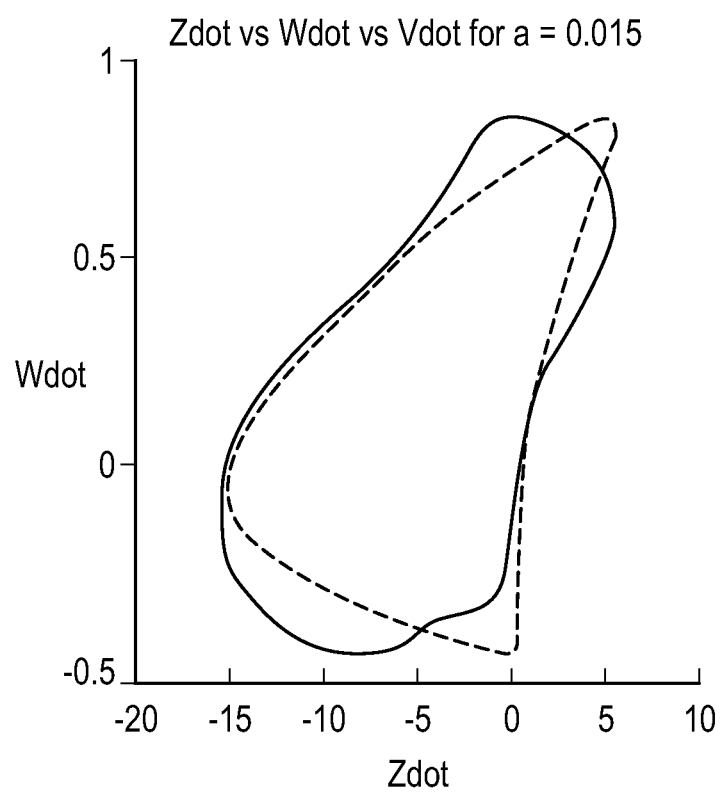
FIG. 8B is a velocity plot comparison of the limit cycle oscillation (LCO) tracks of the cilium of a paramecium with computational tracks of the oscillator.

FIG. 8A and FIG. 8B show position and velocity tracks, respectively; comparing the limit cycle oscillation tracks of the cilium of a paramecium and the computation using Lienard's oscillator as per Equation (2). On both figures, the solid line is an equation model and the broken line shown is the actual measurement of the cilium position and velocity— which is the analog of the transducer. As seen, a close correlation is obtained. The simulation shows that the cilium follows a track—described as a limit cycle. Therefore, the cilium has an autonomous character wherein the cilium is controlled without sensors. The nonlinear autonomic nature of the dynamics of the cilium ensures that the phase coding of the echo is robust.

Figure 9A:
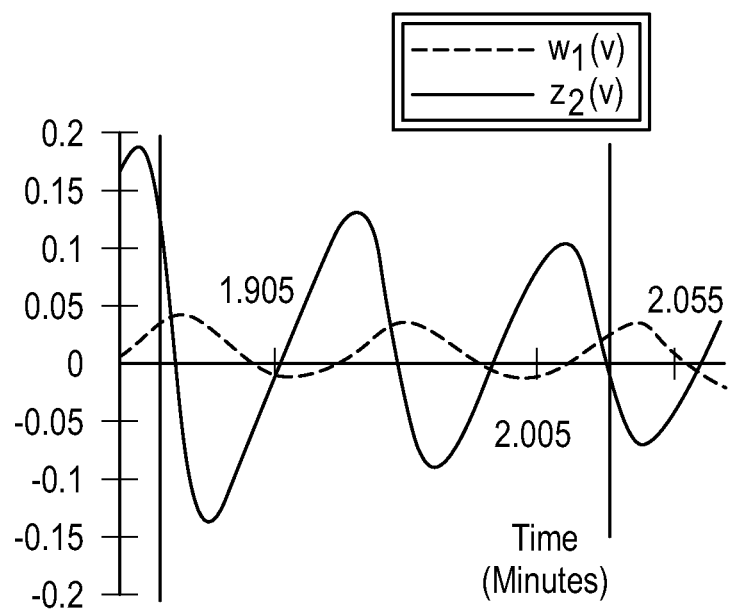
FIG. 9A is a plot depicting the relationship between two nonlinear oscillators with respect to time traces of the variables constant amplitude (w1) and dropping amplitude (z2)
Figure 9B:
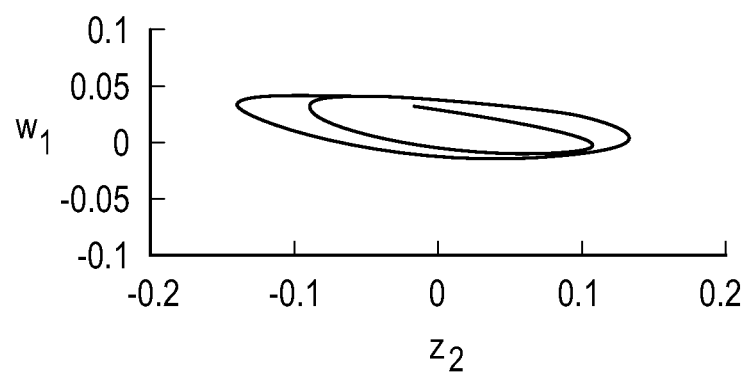
FIG. 9B is a plot depicting state orbits of the oscillators of FIG. 9A plotted between times marked by the vertical lines of FIG. 9A.

A multiplicity of nonlinear sensors captures additional relative phase information. One example considers two sensors, where i=1 and 2 in Equation (2). The temporal relationship between the two oscillators is shown in FIG. 9A and FIG. 9B. Note that while limit cycle oscillation exists in each oscillator; the relationship between the two oscillators is not resonant and the relationship is changing. The incident nonlinear acoustic wave packets (the reference or the echo) would affect each transducer differently and would also have a joint spatially-distributed effect.

The nonlinear interactive approach would be able to capture the effect. This is an example of phase information that a row of linearly oscillating transducers would not be able to capture. The nonlinear oscillators in Equation (2) are self-correcting; therefore, the oscillators robustly capture the phase information.

The wave motion of a group of cilia is called a metachronic wave. The metachronic wave is a collective footprint of a large scale external impulse created by the motion of individual vibrating elements. Therefore, individual cilia are time dependent and are sensitive to the direction and amplitude of the wave. If the wave is nonlinear and is a packet of waves that has a phase identity; then the collection of cilia will produce a visual image of the imposed disturbance. If there is a reference motion due to a transmitted wave, and the later imposed wave is an echo; then by differencing with the transmitted wave, an image of the surroundings from which the echo is coming can be created. This can be described by the difference set or tensor. In a planar situation, an orthogonal axis system exists wherein along one of the axes; the cilia will be in phase and orthogonal to the plane where the cilia are in phase; there will be a phase difference between the neighboring cilia. The spacing between the neighboring cilia has to be of a certain value for the metachronic wave to develop autonomously. Spacing depends on the cilium length and fluid viscosity in which the cilium are submerged and the rotational frequencies of the cilium.

The nonlinear dynamics of the metachronic wave pattern is robust due to autonomous control of the wave pattern. This is an analog solution and therefore is comparatively fast and less computer intensive. This is an important departure from current theories of sonar transducers which are basically linear and digital. The current approach is similar to a closed form solution. Displacement accuracy of the transducer is on the order of Angstroms. Because electronics is not involved; frequency resolution is high.

FIG. 10 depicts the hemispherical drive apparatus 10 that provides orthogonal roll motions to the cilium 12. In the figure; the hemispherical drive apparatus 10 has a housing 16 which has an interior 18 and a centered tip 20. The hemispherical drive apparatus 10 further comprises a plurality of electromagnets 22 positioned within the interior 18 and arranged in an array. The location of each electromagnet 22 is defined by latitude and longitude coordinates. Fabrication using electrical engineering may use an (i, j) matrix to position the electromagnets. Analytically, noise engineers would prefer a polar system (phi, theta). In one embodiment, there are thirty-five electromagnets 22.

The hemispherical housing 16 includes a cover 24 for the interior 18. The hemispherical housing 16 also includes a waterproof membrane 26 which is disposed over the cover 24 (See FIG. 11). The waterproof membrane 26 has a side 28 which contacts the cover 24 and a side 30 which is exposed to water (seawater).

The hemispherical drive apparatus 10 further comprises a gimbal 32 that is attached to the hemispherical housing 16 and located on the waterproof membrane 26. The hemispherical drive apparatus 10 also comprises a shaft 34 that is attached to gimbal 32 such that the shaft is able to roll and oscillate in different planes wherein one plane or rotational axis is orthogonal to the other plane or rotational axis.

Figure 11:
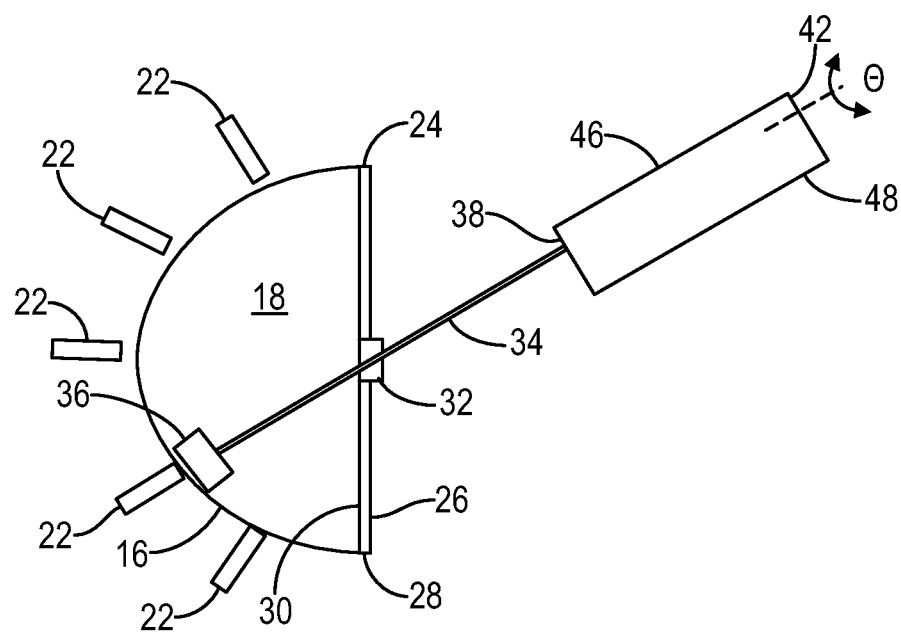
FIG. 11 is a diagram depicting the position and movement of a shaft and fin with respect to an array of electromagnets positioned in a hemispherical housing of the present invention.

In FIG. 11, the shaft 34 has a first end portion 36 which comprises ferromagnetic material and is located within the interior 18 of the hemispherical housing 16. In one embodiment, the first end 36 is configured as a rounded section. The shaft 34 further comprises a second end portion 38 which is external to the interior 18. The first end 36 is spaced apart from the array of electromagnets 22 by a predetermined distance D. The first end 36 remains spaced apart at the predetermined distance D as the shaft 34 rotates in roll oscillation planes φ1 and φ2 (See FIG. 10). The first end 36 does not contact the electromagnets 22.

Figure 12:
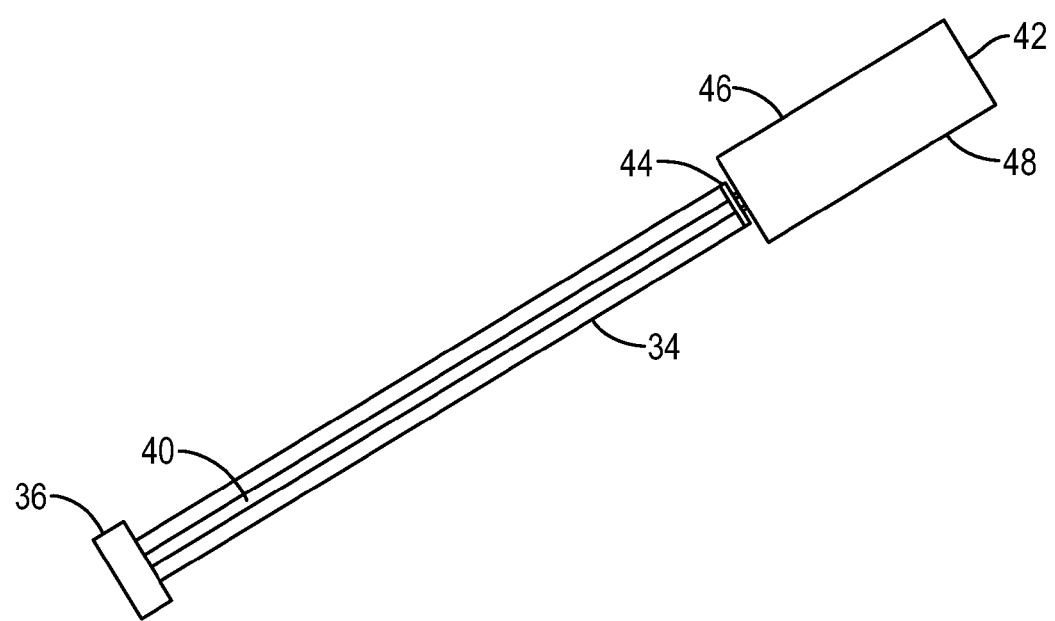
FIG. 12 is a diagram illustrating the distance or spacing between the electromagnets and the first end of the shaft as a gimbal (depicted in FIG. 10) allowing the shaft to roll and oscillate in different planes.
Figure 13:
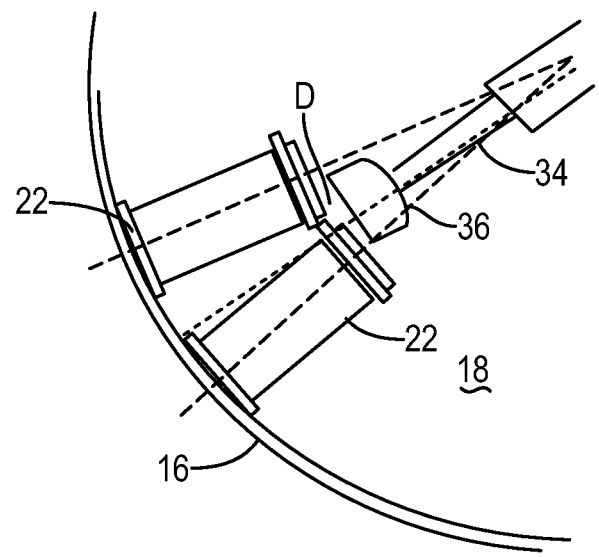
FIG. 13 is a diagram of the shaft and fin attached thereto.

As shown in FIG. 12, the shaft 34 has a hollow interior and an internal shaft 40 located within the interior. The internal shaft 40 is free to rotate within the hollow interior of the shaft 34 about pitch axis θ. An internal pitch motor (not shown) is located within the hollow interior of the shaft 34 and rotates the internal shaft 40 about the pitch axis θ. The internal pitch motor may receive control signals from a control system 60 shown in FIG. 15.

Returning to FIG. 12; the hemispherical drive apparatus 10 further comprises a propulsion fin 42 that is attached to a distal end 44 of the internal shaft 40. The drive apparatus 10 can be built in 10 centimeter (large) scale for flapping fin propulsion as well as 100 micron (small) scale for cilium actuation at a small scale. The cilium length may be 17 microns with a diameter of 1 micron. Both flapping fins and cilium motion follow known nonlinear autonomic equations. Both flapping fins and cilium reject disturbances autonomically (without the need of any sensor or controller) and are robust as a result.

The fin 42 functions as a flapping fin with a leading edge 46 and trailing edge 48. The fin 42 is attached at the 1/3 chord point at the end of the internal shaft 40. Measured from the leading edge 46, the fin 42 is hinged for pitch at this distance of "c/3" where "c" is the fin chord. Pitching at c/3 maximizes hydro efficiency.

As the internal shaft 40 rotates about the pitch axis θ; the flapping fin 42 also rotates about the pitch axis θ. Since pitch oscillation occurs internally to the shaft 34; there is no leakage. A first plane of oscillation is roll oscillation φ1 and a second plane of oscillation is roll oscillation φ2. Roll oscillation plane φ2 is orthogonal to roll oscillation plane φ1.

The viability of the hemispherical drive apparatus 10 can be estimated by calculating the magnetomotive force F, as:

$$F = \frac{(ni)^2 \mu_0 A}{2 l_{gap}^2} \quad (4)$$

where n=number of turns in the coil, i=current through coil (A), $\mu_0$=magnetic permeability in a vacuum, A=area; and $l_{gap}$=air gap between the magnet and steel in the direction of magnetic flux. Compared to $\mu_0$, magnetic permeability of cold rolled steel is 2,000 times larger. For a gap, $l_{gap}$ of 3 to 4 mm, at i=1.5 A, both Equation (4) and measurement of maximum force lead to a force of 0.75 N.

Figure 15:
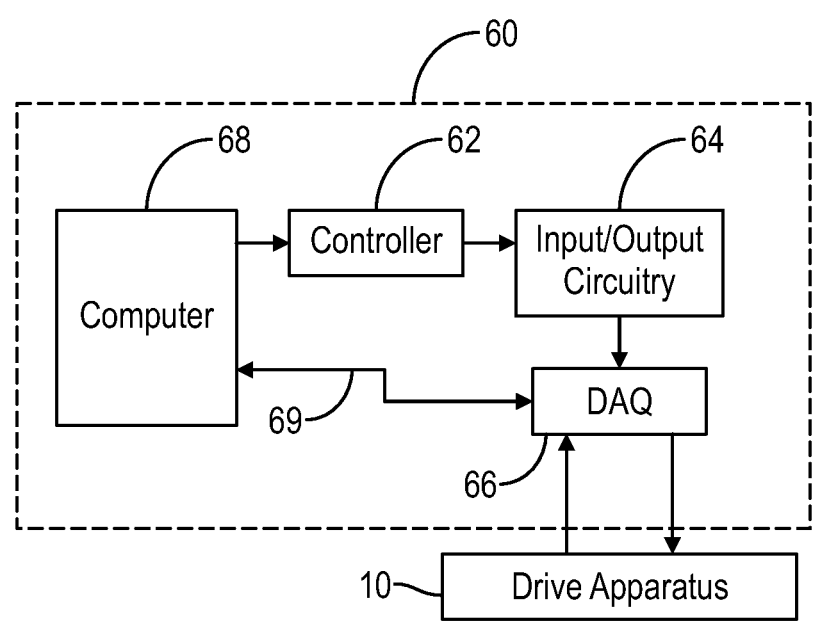
FIG. 15 is a block diagram of a control system for generating signals that excite predetermined electromagnets in order to produce an electromagnetic track.

Referring to FIG. 15, the control system 60 generates signals that sequentially excite the predetermined electromagnets 22 in accordance with a programmed sequential order. Exciting the predetermined electromagnets 22 produces an electromagnetic track. An example of an electromagnetic track 400 is shown in FIG. 10. The electromagnetic track 400 is in the form of a figure-eight pattern or a curve. It is to be understood that the center of the electromagnetic track 400 does not need to be at the center of the hemispherical housing 16. The length of the shaft 34 in centimeters determines the scale in millimeters of the figure-eight electromagnet track 400. Since the first end 36 of the shaft 34 comprises ferromagnetic material; the flux lines created by the excited electromagnets 22 pass through the ferromagnetic material. As a result, the first end 36 moves along the electromagnetic track 400. Due to the function of the gimbal 32; the movement of the first end 36 causes movement of the fin 42.

Referring again to FIG. 15, the control system 60 comprises a controller 62. The controller 62 has a programmable processor that stores the latitude and longitude coordinates of each electromagnet 22 and a plurality of sequences of latitude and longitude coordinates of the electromagnets that are to be excited in sequential order in order to produce the electromagnetic track 400. Each sequence of latitude and longitude coordinates of the electromagnets 22 comprises a sequence of latitude and longitude coordinates of pairs of adjacent electromagnets. One pair of adjacent electromagnets 22 is excited at a time and each succeeding pair of excited electromagnets is adjacent to a pair of previously excited electromagnets. In such an embodiment, the electromagnetic track 400 lies between the electromagnets 22 of each pair of adjacent electromagnets.

The controller 62 outputs digital signals that contain data that correspond to the latitude and longitude coordinates of the electromagnets 22 that are to be excited. The control system 60 includes input/output circuitry 64 that comprises an array of six analog circuits that solve the second ordinary nonlinear ordinary differential equations governing the self-regulating process which is represented by Equation (5) in the ensuing description.

The input/output circuitry 64 outputs signals that are inputted into a digital-to-analog converter (DAQ) 66. The DAQ 66 converts the signals to analog signals that are inputted into the array of electromagnets 22 of the hemispherical drive apparatus 10. A status signal is outputted by the array of electromagnets 22 and inputted into the DAQ 66.

The control system 60 further comprises a computer 68. The computer 68 is used to program the controller 62 and is also in signal communication with the DAQ 66 via a data bus 69. The computer 68 generates DAQ control signals for input into the DAQ 66. The computer 68 programs the programmable processor of controller 62 with the plurality of different sequences of latitude and longitude coordinates of the electromagnets 22 that are to be excited in sequential order.

The control system 60 allows the center of the electromagnetic track 400 to be displaced to a desired position that is not at the center of the hemispherical housing 16. The control system 60 also allows for distortion of the curve of the electromagnetic track 400. This feature allows formation of an electromagnetic track that follows a pattern or curve other than a figure eight.

The fin 42 can be flapped in a desired orientation by using the control system 60 to excite certain electromagnets 22 to produce an electromagnetic track that vectors the required fin force.

Since the shaft 34 is not rotating about the pitch axis θ; there is no leakage at the point where the shaft penetrates the waterproof membrane 26. Furthermore, since the internal shaft 40 rotates internal to the shaft 34; there is no leakage. The pitch oscillation occurs within the hollow interior of the shaft 34; thereby, eliminating the possibility of leakage. The elimination of leakage extends component life and the duration of a mission.

Figure 14:
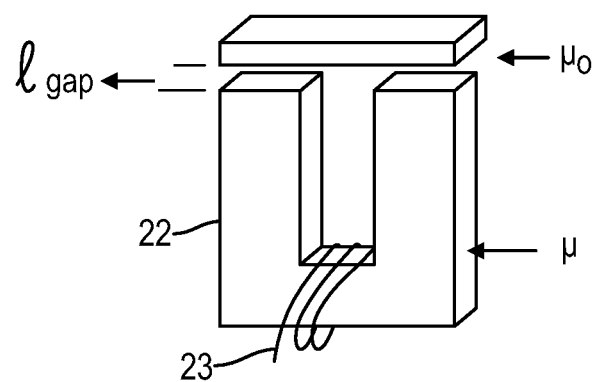
FIG. 14 is a front view of an electromagnet of the hemispherical drive apparatus of the present invention.

The diagram of the electromagnet 22 shown in FIG. 14 was used to model the force produced by each electromagnet. The magneto-motive force F is given by Equation (5):

$$F = \frac{(ni)^2 \mu_0 A}{2 l_{gap}^2} \quad (5)$$

wherein:
n=the number of turns in the coil in each electromagnet,
i=the current through the coil,
$\mu_0$=the magnetic permeability in a vacuum,
A=the area, and
$l_{gap}$=the air gap between the magnet and steel in the direction of the magnetic flux.

Compared to $\mu_0$, the magnetic permeability of cold rolled steel is 2000 times larger. For a $l_{gap}$=3-4 mm at i=1.5 A, both Equation (5) and measurement of maximum force lead to a force of 0.74 N. In one embodiment, the coils are formed by 266 turns of wire 23. The wire 23 is preferably 26 AWG wire.

The hemispherical drive apparatus 10 actuates the flapping fin 42 for low speed maneuvering and effects resonant oscillation of the fin. Resonant oscillation of the fin 42 is desired for several reasons: (a) displacement is amplified, (b) disturbances are rejected, (c) friction is reduced and quality factor (Q) is increased (ratio of maximum kinetic energy to the total input energy), and (d) the motion of the shaft 34 follows set parameters without the need for any sensors or any conventional closed loop control. These properties are realized mathematically by input/output circuitry 64 and are known as self-regulation. In accordance with the present invention, olivo-cerebellar dynamics are used to describe the mathematical form of the self-regulation. The model of the $I^{th}$ ion-related controller is given by Equation (6):

$$\begin{bmatrix} \dot{z} \\ \dot{w}_i \end{bmatrix} = \begin{bmatrix} p_{iz}(z_i) - w_i \\ \varepsilon_{CA}(z_i - I_{Ca}) \end{bmatrix} + \begin{bmatrix} 0 \\ -\varepsilon_{Ca} \end{bmatrix} I_{exit}(t) \quad (6)$$

wherein:
$z_i$ and $w_i$ are associated with sub-threshold oscillations and low-threshold (Ca dependent) spiking;
$\varepsilon_{Ca}$, is a constant parameter that controls the oscillation time scale; and $I_{Ca}$ drives the depolarization levels.

The nonlinear function is represented by Equation (7):

$$p_{iz}(z_i) = z_i(z_i - a_i)(1 - z_i) \quad (7)$$

The function $I_{extt}(t)$ is the extracellular stimulus which is used for the purpose of control (e.g., changing the motion of paramecium direction). If the function $I_{extt}(t)=0$, then the nonlinear function is given by Equation (8):

$$p_{iz}(z_i) = z_i(z_i - a_i)(1 - z_i) \quad (8)$$

wherein:
$a_i$ is a constant parameter associated with the nonlinear function. Equation (6) can be written as Equation (9) which represents the oscillation:

$$\ddot{z}_i + F(z_i)\dot{z}_i + (kz_i) + \epsilon I = 0 \quad (9)$$

wherein:
F is a cubic polynomial function; and
k is a constant.

The oscillator exhibits a closed-orbit $\Gamma_i$ in the state space $(z_i - \dot{z}_i)$; that is $(z_i - w_i)$, which is also known as limit cycle oscillation (LCO), the constant parameters determining the form of $\Gamma_i$.

Equation (2) is solved using the analog oscillators of input/output circuitry 64 (see FIG. 15).

The hemispherical drive apparatus 10 of the present invention provides many benefits and advantages. The drive apparatus 10 is gearless and frictionless and has a significantly lower noise level compared to prior art flapping fin propulsion systems. The drive apparatus 10 consumes relatively less power than prior art systems, has a high quality factor (Q) and extends the duration of the mission. The drive apparatus 10 provides roll oscillation in two planes; thereby, making the degree of freedom more similar to an animal. The drive apparatus 10 can be used to provide a self-regulating trajectory to objects that require very small forces (e.g., cilium-based nonlinear transducer). The drive apparatus 10 is a modular design and also has the potential to reduce actuator drive size.

The drive apparatus 10 can be adapted for use in orthopedic reconstruction. For example, the drive apparatus 10 can be developed as an elbow cap, knee cap or hip replacement. The hemispherical drive 10 can also be used in the field of robotics.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A method for visualizing an object in underwater space, said method comprising the steps of:
   broadcasting a nonlinear wave packet;
   acoustically painting the object;
   receiving a reference wave packet on a cluster of cilia;
   receiving an echo from the object on the cilia; and
   measuring the echo in three dimensions by detection of curvature and torsion on the cilia.

2. The method of claim 1, said method further comprising the step of reading a metachronic three-dimensional pattern in the reference wave packet beam and the echo.

3. The method of claim 2, said method further comprising the steps of converting the metachronic three-dimensional pattern in the reference wave packet beam into a first hologram and converting the metachromic three-dimensional pattern in the echo into a second hologram.

4. The method of claim 3, said method further comprising the step of transmitting the first hologram and the second hologram.

5. The method of claim 4, said method further comprising the step of decoding the object by differentiating the first hologram from the second hologram.

6. The method of claim 5, said method further comprising the step of displaying a virtual image of the object.

7. The method of claim 6, wherein the wave packet is split into a reference optical beam and an illumination optical beam by a beam splitter.

8. The method of claim 7, wherein the cilia are fabricated from flexible transparent polymer fibers such that the color of light changes with changes in curvature and torsion thereof.

9. A method for encoding and visualizing an object in underwater space, said method comprising the steps of:
broadcasting a nonlinear wave packet;
receiving a reference wave packet beam on a cluster of cilia;
acoustically painting the object in the underwater space;
receiving an echo from the object;
measuring the echo in three dimensions by detection of curvature and torsion on the cilia;
reading a metachronic three-dimensional pattern in the reference wave packet beam and the echo;
converting the metachronic three-dimensional pattern in the reference wave packet beam into a first hologram and converting the metachronic three-dimensional pattern in the echo into a second hologram; and
transmitting the first hologram and the second hologram.

10. The method of claim 9, further comprising the steps of:
decoding the object by differentiating the first hologram from the second hologram; and
displaying a virtual image of the object.

* * * * *